US006881064B2

(12) United States Patent
Green et al.

(10) Patent No.: US 6,881,064 B2
(45) Date of Patent: *Apr. 19, 2005

(54) GLOBE STAND CONSTRUCTION

(75) Inventors: Paul H. Green, Deerfield, IL (US); Perry Engstrom, Mount Prospect, IL (US); Jeffrey D. Bransky, Chicago, IL (US); Gregory J. Foster, Chicago, IL (US); Robert W. Sheldon, Chicago, IL (US)

(73) Assignee: Replogle Globes, Inc., Broadview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/733,505

(22) Filed: Dec. 11, 2003

(65) Prior Publication Data

US 2004/0197746 A1 Oct. 7, 2004

Related U.S. Application Data

(63) Continuation of application No. 10/145,913, filed on May 15, 2002, now Pat. No. 6,726,484.

(51) Int. Cl.[7] .............................................. G09B 27/08
(52) U.S. Cl. ....................................... 434/131; 434/137
(58) Field of Search ................................. 434/131–153

(56) References Cited

U.S. PATENT DOCUMENTS

| 888,854 A | * | 5/1908 | Sheldon | 434/132 |
|---|---|---|---|---|
| 892,715 A | * | 7/1908 | De Vilbiss | 434/131 |
| 939,515 A | * | 11/1909 | Kilroy | 434/137 |
| 978,997 A | * | 12/1910 | Fries | 434/142 |
| 2,014,290 A | * | 9/1935 | Pohlman | 434/131 |
| 2,200,821 A | * | 5/1940 | Colberg | 434/145 |
| 2,511,770 A | * | 6/1950 | Dupler | 434/131 |
| 2,628,436 A | * | 2/1953 | Dupler | 434/145 |
| 2,958,959 A | * | 11/1960 | Hubbard | 434/131 |
| 3,086,299 A | * | 4/1963 | Wilkerson | 434/136 |
| 4,083,122 A | * | 4/1978 | Denney | 434/137 |
| 4,752,228 A | * | 6/1988 | Masunaga | 434/131 |
| 5,505,621 A | * | 4/1996 | Lamphiear | 434/137 |
| 6,726,484 B1 | * | 4/2004 | Green et al. | 434/131 |

OTHER PUBLICATIONS

Photograph of prior art globe construction made in Germany approximately 41/2 inches in diameter on a stand pivital about equatorial and polar axis.*

Photograph of Replogle Globe, Inc. 3.3 inch diameter globe on a stand rotatable about polar axis.*

* cited by examiner

Primary Examiner—Derris H. Banks
Assistant Examiner—Dmitry Suhol
(74) Attorney, Agent, or Firm—Banner & Witcoff, LTD

(57) ABSTRACT

A globe stand construction for mounting a globe from a single support arm includes hemisphere sections connected together by a polar axis pin mounted in a bushing plate which includes a radial, equatorial axis passage for receipt of a single pin projecting from a single support arm mounted on a base positioned beneath the globe.

11 Claims, 4 Drawing Sheets

FIG.1
FIG.3
FIG.2
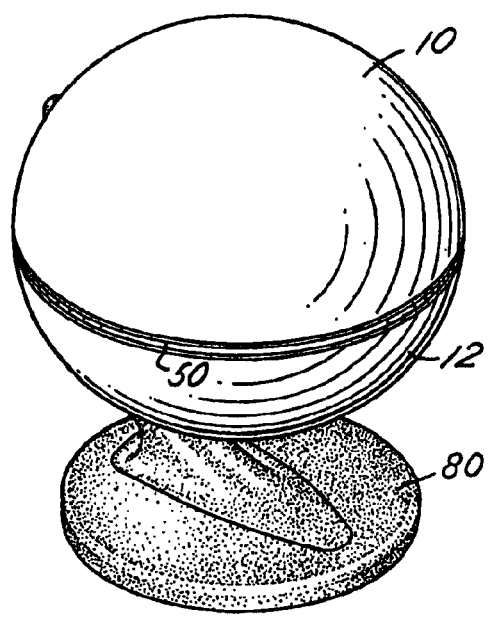
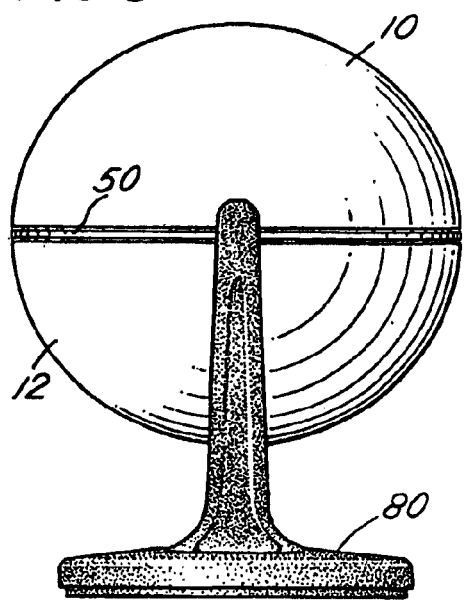
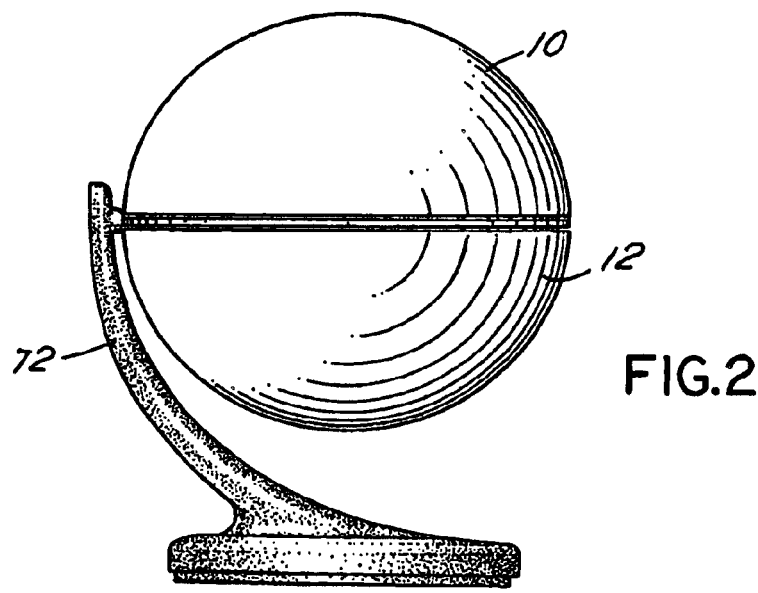

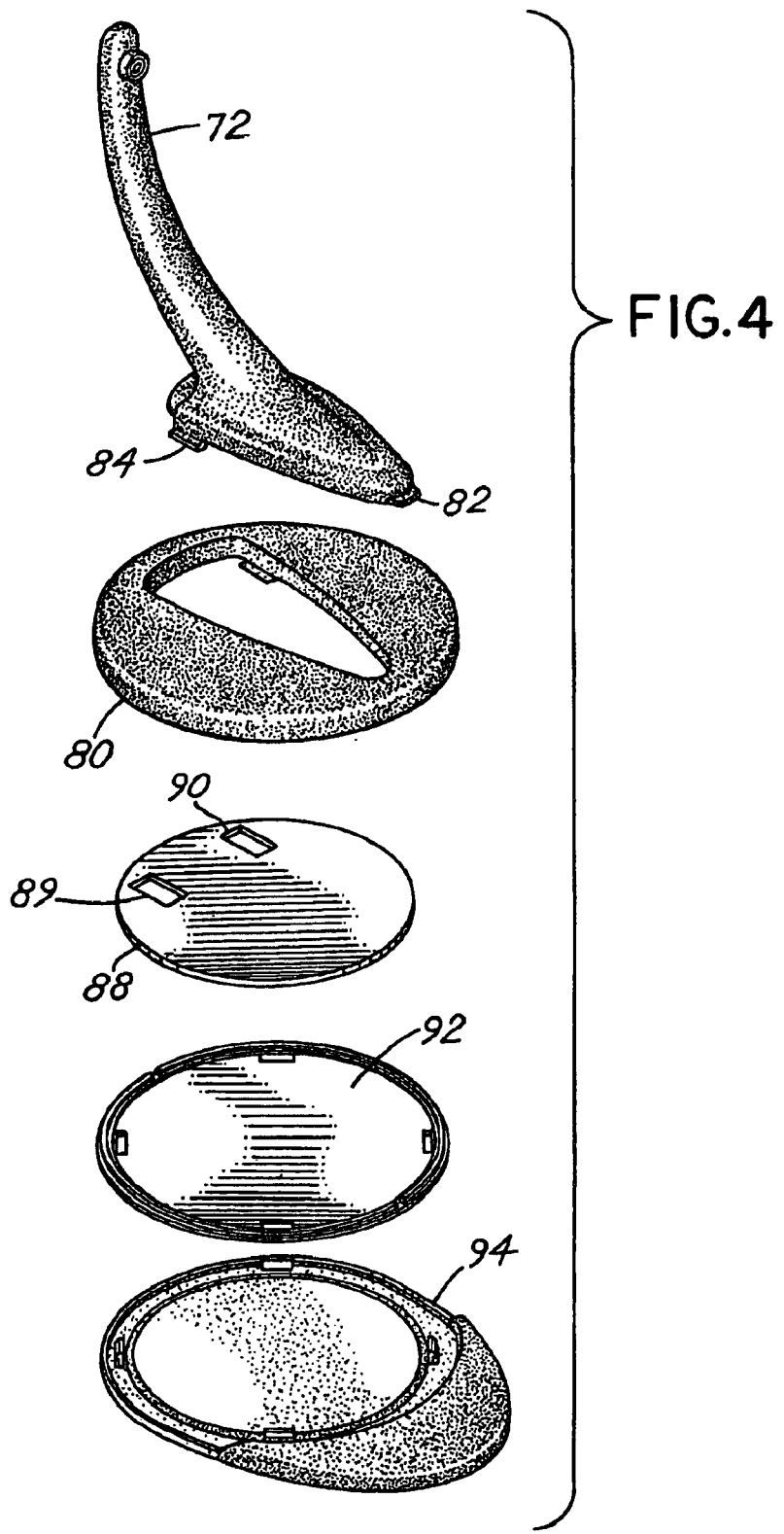

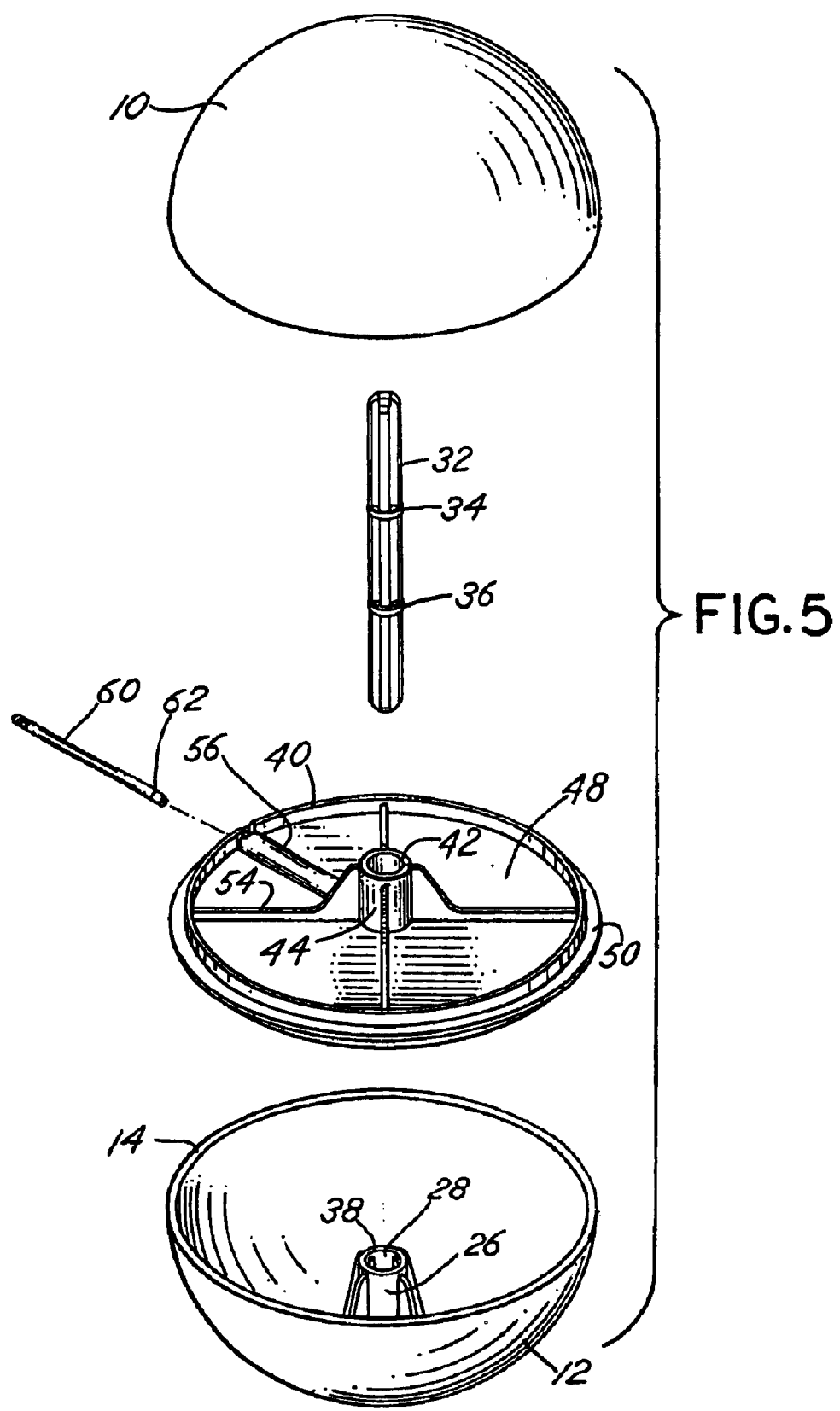

GLOBE STAND CONSTRUCTION

CROSS REFERENCE TO RELATED APPLICATION

This application is a continuation of application Ser. No. 10/145,913 filed May 15, 2002 now U.S. Pat. No. 6,726,484 entitled "Globe Stand Construction" for which priority is claimed.

This patent document contains material, which is subject to copyright protection. The copyright owner has no objection to reproduction by anyone of this patent document, in whole or in part, as it appears in the Patent and Trademark Office patent records, but otherwise reserves all copyright rights therein.

BACKGROUND OF THE INVENTION

In a principal aspect, the present invention relates to a globe stand, which enables mounting of a geographical globe upon a base by means of a single support arm while enabling the sphere comprising the globe to rotate about a polar axis, as well an equatorial axis simultaneously.

Typically, geographic globes are mounted on a base with either a single or multiple arms, so as to permit rotation of the globe, most often about the polar axis. For example, with a globe mounting system incorporating a single arm, the arm will extend from a point associated with the north pole of the globe around the globe surface to the south pole of the globe. The arm is then attached to a base. Pins are associated with connection of the arm to the north and south polar points, so that the globe may be rotated about a polar axis.

In some circumstances, a globe will be mounted on a stand, which supports the lower portion of the globe on three, or four separate spaced arms, thereby enabling the globe to be manipulated in any orientation. Another globe mounting mechanism provides for a pair of globe arms that project upwardly from a stand and connect to pins extending laterally into an equatorial plate, so that the globe may be rotated about the pins through an equatorial axis. The equatorial plate may serve as a mounting plate for hemispheres supported on polar pins or rods, which enable rotation of the globe about a polar axis. Thus, the globe in such a construction may be rotated about both a polar axis, as well as an equatorial axis. However, two arms are necessary to provide movement about the equatorial axis.

Visualization of countries on a globe is inhibited by such a two-arm construction. Thus, there has developed a need and desire to provide a globe mounting construction, which will enable movement of the globe about both a polar axis, as well as an equatorial axis, while supporting the globe properly in a manner which will ensure maintenance of an upright orientation of the globe, as it is being manipulated.

SUMMARY OF THE INVENTION

Briefly, the present invention comprises a globe stand construction for mounting a globe from a single support arm on a base in a manner, which permits rotation of the globe simultaneously about both a polar axis and an equatorial axis. Thus, a base is provided with a single mounting arm extending from the base upwardly to an equatorial axis connection point. A mounting pin is fixed to the equatorial axis connection point of the mounting arm and is inserted into a mounting plate supported by the mounting pin, generally over the base. The globe is divided into northern and southern hemispheres, and a polar mounting pin or rod connects to the poles of the hemispheres within the interior of the hemispheres. The polar pin is journaled into the center of the equatorial plate transverse to the plate and equatorial pin, thus permitting rotation of the hemispheres about the polar axis defined by the polar pin. Thus, the assembled hemispheres may be simultaneously rotated about an equatorial axis, as well as a polar axis.

The globe is supported generally over the base, so that the base acts as a counterweight to ensure maintenance of the proper orientation of the globe, while at the same time permitting full visual access. Further, the stand or base for the globe construction is fabricated from a series of plates, which are attached to the mounting arm. The plates provide a decorative appearance for the base or stand, and also encapsulate a counterweight, for example, a metal plate counterweight which may be of adjustable thickness to provide for accommodation of distinctive globe sizes, shapes, weights, materials, and the like. The base or stand further includes an auxiliary collar or support stand, which may be incorporated with the base for purposes of labeling, or as further decoration, or as further support for the globe.

The bushing, which permits rotational movement of the polar axial pin, as well as the bushing for the equatorial axis mounting pin, may be in the form of a circular equatorial plate, which separates the hemispheres forming the globe, to thereby define the equator of the globe. The plate may thus be fabricated in a manner which provides bores or passages that engage and support the axial pins and provide for structural integrity in the connection between the pins and the bushing or plate member. The bushing or plate member may have a variety of configurations and shapes to accommodate the functional objectives of providing a rotational mounting member for both polar axial and equatorial axial movement. Thus, the particular configuration of the bushing or plate and the particular connection between the bushing and the polar mounting pin, as well as the equatorial mounting pin, may be varied greatly, and it is contemplated that numerous types of connections and component parts forming the "pins" and "bushing" may be utilized.

Thus, it is an object of the invention to provide an improved globe stand construction and, in particular, a globe stand construction for mounting a globe for rotation simultaneously about both a polar axis and an equatorial axis.

A further object of the invention is to provide a construction for a globe stand, which provides a counterweight for a globe suspended and supported over a base.

Another object of the invention is to provide a globe stand construction which is economical to manufacture, easy to assemble, and which is rugged, yet which enables full visual access to the globe.

These and other objects, features, and advantages of the invention will be set forth in the detailed description which follows.

BRIEF DESCRIPTION OF THE DRAWING

In the detailed description which follows, reference will be made to the drawing comprised of the following figures:

FIG. 1 is an isometric view of the construction including the globe and the stand for the globe;

FIG. 2 is a side elevation of the globe of FIG. 1;

FIG. 3 is a side view of the globe of FIG. 2;

FIG. 4 is a an exploded isometric view of the stand or base for the globe of FIG. 1;

FIG. 5 is an exploded view depicting the construction of the globe of FIG. 1;

DESCRIPTION OF THE PREFERRED EMBODIMENT

Figure 6:
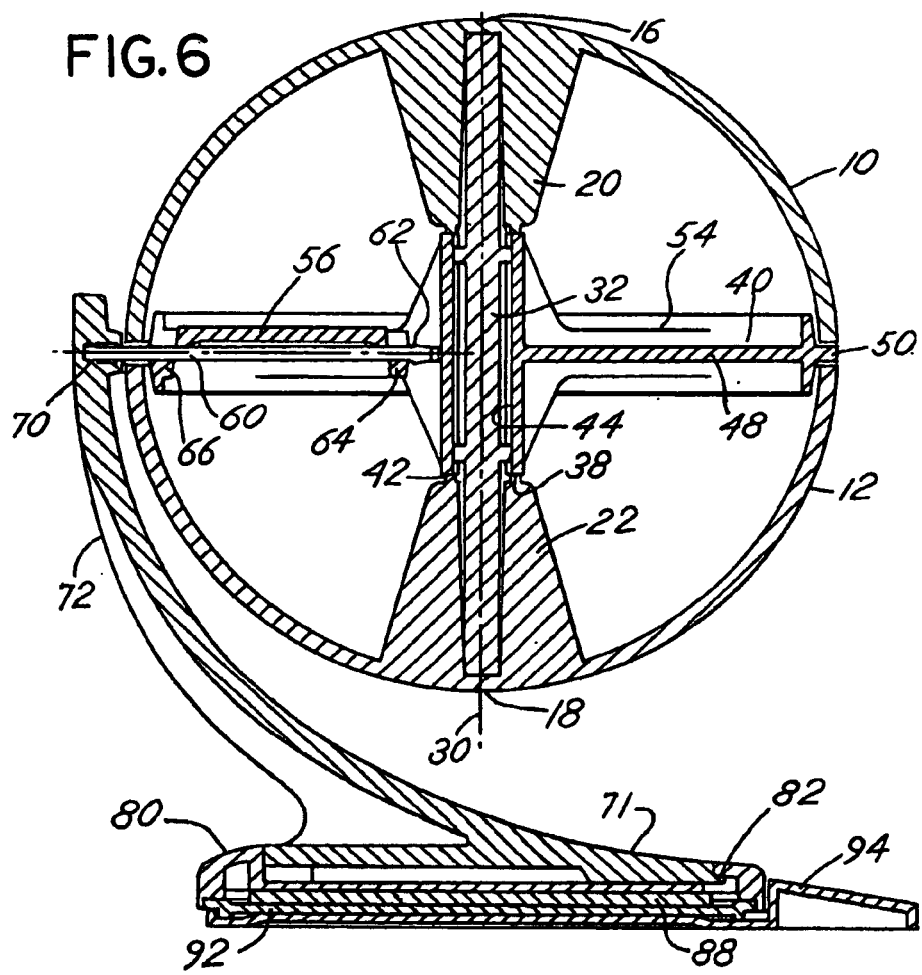
FIG. 6 is a cross-sectional view of the globe with a supplemental base plate or nameplate incorporated therewith.
Figure 7:
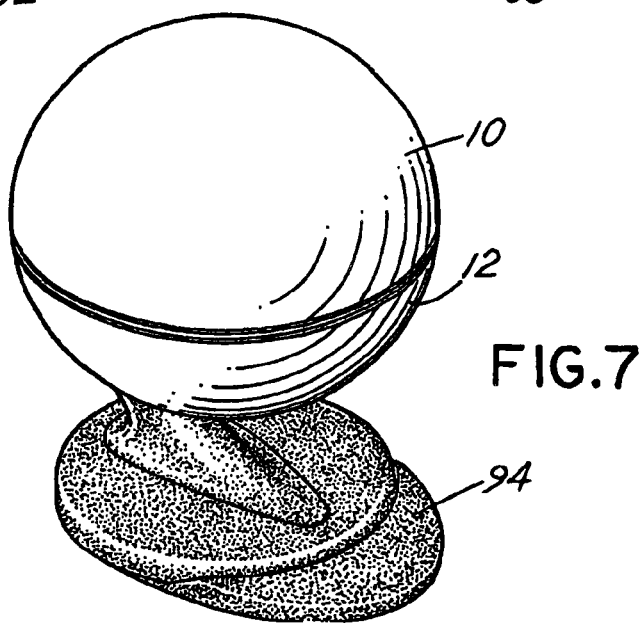
FIG. 7 is an isometric view of the globe of FIG. 6.

The globe construction incorporates an upper or northern hemisphere 10 and a lower or southern hemisphere 12. The hemispheres 10, 12 are in the shape of a bowl with a peripheral rim or rib 14 and a pole 16 associated with the northern or upper hemispheric section 10 and a pole 18 associated with the lower hemispheric section 12. Each hemisphere 10 and 12 is generally hollow but includes a projecting internal axially extending counterbore assembly 20 and 22, respectively. Each assembly 20, 22 is comprised of a cylindrical sector 26, which includes a cylindrical passage 28 aligned with a polar axis 30. A polar axis mounting pin 32 is provided for engagement with the opposed cylindrical openings 28 associated with the respective hemispheres 10 and 12. The axis pin 32 engages the cylindrical openings 28 and rigidly connects the hemispheres 10 and 12. The axis pin includes a first circumferential bearing surface 34 and a second, spaced circumferential bearing surface 36 for cooperation with a bearing plate to be described hereinafter, as bearing plate 40.

The cylindrical housing 26 associated with each hemisphere 10 and 12 includes a circular seat or surface 38, which cooperates with an opposed seat, or surface 42 associated with plate 40. Thus, each hemisphere 10 and 12 includes bearing rings or surfaces 38 which engage against bearing surfaces 42 associated with a cylindrical passage 44 molded into the bearing or bushing plate 40. The openings 28, 44 are aligned to be coincident with polar axis 30, as depicted in FIG. 6. The tolerances and spacing of the component parts is such that the axial pin 32 appropriately positions the bearing surfaces 38 and 42 of each hemisphere 10, 12 in communication with each other to permit rotational movement on those surfaces and, thus, rotational movement about axis 30.

The plate or bushing assembly 40, in addition to a cylindrical center or axial section 44, includes a radial plate section 48 with a rim or external rib 50 that extends between the hemispheres 10 and 12, as depicted in FIG. 6. The rim 50 serves to space the hemispheres 10 and 12 from one another. The plate 48 provides structural integrity for the bushing construction 40. An internal annular rib or rim 54 further enhances the structural integrity of the bushing 40.

The bushing 40 further includes a cylindrical housing 56 extending along a radial path perpendicular to and from the centerline axis of the passage 44. The passage or bore 56 is fashioned to receive a metal pin or rod 60 extending radially from the centerline axis of the bushing plate 40 and projecting outwardly therefrom, as depicted in FIG. 6. The rod or pin 60 includes a detent 62 to lock the rod or pin 60 in position within the passage or housing 56. The rod or pin 60 may thus rotate about the axis thereof on bushings 64 and 66 defined by the passage 56. In a similar fashion, the axis pin 32 is rotatable on the bearing surfaces or 34 and 36 within the passage 42 through the plate 40.

The pin 60 projects outwardly from the assembled globe, along the equator defined by plate 40, and is rigidly fastened to a connection point 70 of an arm 72. The arm 72 is attached to a stand for the assembled globe. The arm 72 is an arcuate member, as depicted in FIG. 6 and projects beneath the assembled globe. The arm 72 is fastened to a base member 80 by means of snap-in tabs 82 and 84 associated with a lower end plate 71 of the arm 72. The tabs 82 and 84 snap into the stand base 80, and also project downwardly through a counterweight plate 88 which is a metal plate with openings 89 and 90 therethrough for receipt of tabs 84 to thereby grip the metal plate 88 to the base 80. The metal weight plate 88 may be adjusted and sized, so as to accommodate the weight and size of the assembled hemispheres 10 and 12. A molded plastic bottom cover 92 is retained by snap fitting into the base 80, as depicted in FIG. 6. An additional ring base member 94, which may include a name plate, and which extends about the periphery or circumference of the base 80, provides for extra stability, and also provides a means for labeling of the globe. The add-on base plate or nameplate 94 is not necessary in order to practice the invention, but it constitutes a preferred embodiment. The shape of the base is depicted as generally circular, however, other shapes are possible. Further, it is preferred that the base be oriented or aligned, so that it remains beneath the assembled hemispheres 10 and 12, so as to act as a counterbalance therefore. The entire assembly may be manufactured from plastic materials, except that the pin 60 is preferably a metal pin and the weight or counterweight plate 88 is preferably a metal material because of its greater density or weight per unit volume. The component parts may be molded in any color, and otherwise decorated or painted. The equatorial rim 50 may also be provided in any distinctive color, or it may be colored in a fashion will provide for incorporation in the maps which form the hemispheres 10 and 12.

In operation, the globe hemispheres are rigidly connected to one another and rotate about axis 30, which is a polar axis. The joined hemispheres 10 and 12 may also rotate around the equatorial axis of the pin 60. The rotations may be effected simultaneously.

Important characteristics of the construction include the feature that a single mounting arm is provided which enables rotation simultaneously about an equatorial, as well as a polar axis. The hemispheres 10 and 12 are connected rigidly to one another, yet rotate freely on bearings 34 and 36. The construction of the counterbores 28 and the spacing of the counterbores 28 with respect to the passage 44 ensures that the hemispheres 10 and 12 will be properly aligned with respect to the bushing plate 40. The assembly of the base is such that the globe, despite its size, is counterbalanced. The base includes various component parts that snap together to form a total assembly, and the counterbalance weight 88 is adjustable depending upon the size and position of the hemispheres 10 and 12. The component parts of the invention may be altered or changed, without departing from the spirit and scope of the invention. For example, the size and construction of the pin 32, as well as the pin 60 and the bushing plate 40, may be altered or changed, without departing from the spirit and scope of the invention. The invention is, therefore, only to limited only by the following claims and equivalents thereof.

What is claimed is:

1. A globe stand construction for mounting a globe from a single support arm for rotation about a polar axis and an equatorial axis simultaneously, comprising, in combination;

a base;

a single arcuate mounting arm extending from the base upwardly to an axial connection point;

a mounting pin fixed to the connection point of the mounting arm and projecting over the base;

a first hemisphere with a first pole and a first equatorial rim;

a second hemisphere with a second pole and a second equatorial rim;

a polar pin connecting the poles and spacing the equatorial rims in opposed relation; and a polar pin bushing member having a polar through passage with the polar pin extending therethrough, said bushing member also including a single mounting pin connection, said polar pin and said mounting pin each rotatably connected to the bushing member for simultaneous rotation of the globe about a polar axis and an equatorial axis, said bushing member comprising having an outside rib positioned between the first and second hemispheres, and said bushing member further including a radial mounting pin passage said mounting pin passage extending from the outside rib toward the polar through passage, said mounting pin in the mounting pin passage including a mechanism for retaining the mounting pin in the mounting pin passage, said hemispheres defining an equatorial axis and said polar pin defining a polar axis at right angles to the equatorial axis.

2. A globe stand construction as set forth in claim 1 further including a separable weight member attachable to the base to provide a counterweight.

3. The globe stand construction of claim 1 further including a detachable auxiliary base member attachable to the base member.

4. The construction of claim 1 including bushings formed in the mounting pin passage and a detent element in the mounting pin.

5. A globe stand construction for mounting a globe from a single support arm for rotation about a polar axis and an equatorial axis simultaneously, comprising, in combination;

a base;

a single arcuate mounting arm extending from the base upwardly to an equatorial radius connection point;

a first hemisphere with a first pole, a first polar axis and a first equatorial rim;

a second hemisphere with a second pole, a second polar axis and a second equatorial rim;

a single equatorial mounting plate bushing member;

a polar axis pin connected to the first pole and to the second pole, said first and second hemispheres rotatably mounted on said plate bushing member with the equatorial rims in opposed, spaced relation and the polar axes in alignment; and said plate bushing member also including a single radial equatorial mounting pin connection, said mounting pin connection rotatably connected to the mounting arm for simultaneous rotation of the globe about a polar axis and a radial equatorial axis, said bushing member further including an outside rib positioned between the first and second hemispheres along the equatorial rims.

6. A globe stand construction as set forth in claim 5 further including a separable weight member attachable to the base to provide a counterweight.

7. The globe stand construction of claim 5 further including a detachable auxiliary base member attachable to the base member.

8. The globe stand construction of claim 5 wherein the radial, equatorial mounting pin connection includes a mounting pin extending between the plate bushing member and the mounting arm connection point, said mounting pin retained in the plate bushing member and extending radially toward the polar axis, said plate bushing member rotatable about the radial axis.

9. A globe stand construction for mounting a globe from a single support arm for rotation about a polar axis and an equatorial axis simultaneously, comprising, in combination;

abase;

a single arcuate mounting arm extending from the base upwardly to an axial connection point;

a mounting pin attached to the connection point of the mounting arm and projecting over the base;

a first hemisphere with a first pole, a first polar axis and a first equatorial rim;

a second hemisphere with a second pole, a second polar axis and a second equatorial rim;

a polar axis pin connected to the first pole and second pole, said equatorial rims in opposed, spaced relation; and a polar pin bushing member between the first and second hemispheres for engaging the polar pin, said bushing member also including a single mounting pin connection, said polar pin and said mounting pin each rotatably connected to the bushing member for simultaneous rotation of the globe about a polar axis and an equatorial axis, said bushing member further including an outside rib positioned between the first and second hemispheres, and said bushing member further including a radial mounting pin passage said mounting pin passage extending radially from the outside rib toward the polar axis, said mounting pin in the mounting pin passage and including a mechanism for retaining the mounting pin in the mounting pin passage, said hemispheres defining an equatorial axis and said polar pin defining a polar axis at right angles to the equatorial axis, said mounting pin rotatably connected to the mounting arm.

10. A globe stand construction as set forth in claim 9 further including a separable weight member attachable to the base to provide a counterweight.

11. The globe stand construction of claim 9 further including a detachable auxiliary base member attachable to the base member.

* * * * *